US011942094B2

(12) United States Patent
Chojnacka et al.

(10) Patent No.: US 11,942,094 B2
(45) Date of Patent: Mar. 26, 2024

(54) HYBRID MULTILINGUAL TEXT-DEPENDENT AND TEXT-INDEPENDENT SPEAKER VERIFICATION

(71) Applicant: Google LLC, Mountain View, CA (US)

(72) Inventors: Roza Chojnacka, Jersey City, NJ (US); Jason Pelecanos, Mountain View, CA (US); Quan Wang, Hoboken, NJ (US); Ignacio Lopez Moreno, New York, NY (US)

(73) Assignee: Google LLC, Mountain View, CA (US)

( * ) Notice: Subject to any disclaimer, the term of this patent is extended or adjusted under 35 U.S.C. 154(b) by 258 days.

(21) Appl. No.: 17/211,791

(22) Filed: Mar. 24, 2021

(65) Prior Publication Data

US 2022/0310098 A1    Sep. 29, 2022

(51) Int. Cl.
*G10L 17/02*    (2013.01)
*G06F 16/9032*    (2019.01)
*G10L 15/08*    (2006.01)

(52) U.S. Cl.
CPC ........ *G10L 17/02* (2013.01); *G06F 16/90332* (2019.01); *G10L 2015/088* (2013.01)

(58) Field of Classification Search
CPC .............. G10L 17/02; G10L 2015/088; G06F 16/90332
See application file for complete search history.

(56) References Cited

U.S. PATENT DOCUMENTS

| 2015/0046162 A1 | 2/2015 | Aley-Raz et al. | |
|---|---|---|---|
| 2015/0294670 A1* | 10/2015 | Roblek | G10L 17/18 704/232 |
| 2016/0225374 A1 | 8/2016 | Rodriguez | |
| 2019/0043507 A1* | 2/2019 | Huang | G10L 17/24 |
| 2019/0251975 A1* | 8/2019 | Choi | G06F 21/32 |
| 2022/0036894 A1* | 2/2022 | Peter | G06F 21/604 |

FOREIGN PATENT DOCUMENTS

WO    2020117639    11/2020

OTHER PUBLICATIONS

International Search Report and Written Opinion for the PCT application PCT/US2022/019576 dated Oct. 16, 2023.

* cited by examiner

*Primary Examiner* — Sonia L Gay
(74) *Attorney, Agent, or Firm* — Honigman LLP; Brett A. Krueger; Grant Griffith

(57) ABSTRACT

A speaker verification method includes receiving audio data corresponding to an utterance, processing a first portion of the audio data that characterizes a predetermined hotword to generate a text-dependent evaluation vector, and generating one or more text-dependent confidence scores. When one of the text-dependent confidence scores satisfies a threshold, the operations include identifying a speaker of the utterance as a respective enrolled user associated with the text-dependent confidence score that satisfies the threshold and initiating performance of an action without performing speaker verification. When none of the text-dependent confidence scores satisfy the threshold, the operations include processing a second portion of the audio data that characterizes a query to generate a text-independent evaluation vector, generating one or more text-independent confidence scores, and determining whether the identity of the speaker of the utterance includes any of the enrolled users.

26 Claims, 5 Drawing Sheets

HYBRID MULTILINGUAL TEXT-DEPENDENT AND TEXT-INDEPENDENT SPEAKER VERIFICATION

TECHNICAL FIELD

This disclosure relates to hybrid multilingual text-dependent and text-independent speaker verification.

BACKGROUND

In a speech-enabled environment, such as a home or automobile, a user may access information and/or control various functions using voice input. The information and/or functions may be personalized for a given user. It may therefore be advantageous to identify a given speaker from among a group of speakers associated with the speech-enabled environment.

Speaker verification (e.g., voice authentication) provides an easy way for a user of a user device to gain access to the user device. Speaker verification allows the user to unlock, and access, the user's device by speaking an utterance without requiring the user manually enter (e.g., via typing) a passcode to gain access to the user device. However, the existence of multiple different languages, dialects, accents, and the like, presents certain challenges for speaker verification.

SUMMARY

One aspect of the present disclosure provides a computer-implemented method for speaker verification that when executed on data processing hardware causes the data processing to perform operations that include receiving audio data corresponding to an utterance captured by a user device. The utterance includes a predetermined hotword followed by a query specifying an action to perform. The operations also include processing, using a text-dependent speaker verification (TD-SV) model, a first portion of the audio data that characterizes the predetermined hotword to generate a text-dependent evaluation vector representing voice characteristics of the utterance of the hotword and generating one or more text-dependent confidence scores. Each text-dependent confidence score indicates a likelihood that the text-dependent evaluation vector matches a respective one of one or more text-dependent reference vectors, and each text-dependent reference vector is associated with a respective one of one or more different enrolled users of the user device. The operations further include determining whether any of the one or more text-dependent confidence scores satisfy a confidence threshold. When one of the text-dependent confidence scores satisfy the confidence threshold, the operations include identifying a speaker of the utterance as the respective enrolled user that is associated with the text-dependent reference vector corresponding to the text-dependent confidence score that satisfies the confidence threshold, and initiating performance of the action specified by the query without performing speaker verification on a second portion of the audio data that characterizes the query following the hotword. When none of the one or more text-dependent confidence scores satisfy the confidence threshold, the operations include providing an instruction to a text-independent speaker verifier. The instruction, when received by the text-independent speaker verifier, causes the text-independent speaker verifier to process, using a text-independent speaker verification (TI-SV) model, the second portion of the audio data that characterizes the query to generate a text-independent evaluation vector. The operations further include generating one or more text-independent confidence scores each indicating a likelihood that the text-independent evaluation vector matches a respective one of one or more text-independent reference vectors. Each text-independent reference vector is associated with a respective one of the one or more different enrolled users of the user device. The operations also include determining, based on the one or more text-dependent confidence scores and the one or more text-independent confidence scores, whether the identity of the speaker that spoke the utterance includes any of the one or more different enrolled users of the user device.

Implementations of the disclosure may include one or more of the following optional features. In some implementations each of the one or more different enrolled users of the user device has permissions for accessing a different respective set of personal resources, and performance of the action specified by the query requires access to the respective set of personal resources associated with the respective enrolled user identified as the speaker of the utterance. In some examples, the data processing hardware executes the TD-SV model and resides on the user device, and the text-independent speaker verifier executes the TI-SI model and resides on a distributed computing system in communication with the user device via a network. In these examples, when none of the one or more text-dependent confidence scores satisfy the confidence threshold, providing the instruction to the text-independent speaker verifier includes transmitting the instruction and the one or more text-dependent confidence scores from the user device to the distributed computing system.

In some implementations, the data processing hardware resides on one of the user device or a distributed computing system in communication with the user device via a network. Here, the data processing hardware executes both the TD-SV model and the TI-SV model. In some examples, the TI-SV model is more computationally intensive than the TD-SV model. In some implementations, the operations further include detecting, using a hotword detection model, the predetermined hotword in the audio data that precedes the query, where the first portion of the audio data that characterizes the predetermined hotword is extracted by the hotword detection model.

In some examples, the TD-SV model and the TI-SV model are trained on a plurality of training data sets. Each training data set is associated with a different respective language or dialect and includes corresponding training utterances spoken in the respective language or dialect by different speakers. Each corresponding training utterance includes a text-dependent portion characterizing the predetermined hotword and a text-independent portion characterizing a query statement that follows the predetermined hotword. Here, the TD-SV model is trained on the text-dependent portion of each corresponding training utterance in each training data set of the plurality of training data sets, and the TI-SV model is trained on the text-independent portion of each corresponding training utterance in each training data set of the plurality of training data sets. In these examples, the corresponding training utterances spoken in the respective language or dialect associated with at least one of the training data sets may pronounce the predetermined hotword differently than the corresponding training utterances of the other training data sets. In some additional examples, the TI-SV model is trained on the text-dependent portion of at least one corresponding training utterance in one or more of the plurality of training data sets. Additionally, or alternatively, the query statements characterized by the text-independent portions of the training utterances include variable linguistic content.

In some implementations, when generating the text-independent evaluation vector, the text-independent speaker verifier uses the TI-SV model to process both the first portion of the audio data that characterizes the predetermined hotword and the second portion of the audio data that characterizes the query. Additionally or alternatively, each of the one or more text-dependent reference vectors may be generated by the TD-SV model in response to receiving one or more previous utterances of the predetermined hotword spoken by the respective one of the one or more different enrolled users of the user device. Each of the one or more text-independent reference vectors may be generated by the TI-SV model in response to receiving one or more previous utterances spoken by the respective one of the one or more different enrolled users of the user device.

Another aspect of the disclosure provides a system for speaker verification. The system includes data processing hardware and memory hardware in communication with the data processing hardware. The memory hardware stores instructions that when executed on the data processing hardware cause the data processing hardware to perform operations. The operations include receiving audio data corresponding to an utterance captured by a user device. The utterance includes a predetermined hotword followed by a query specifying an action to perform. The operations also include processing, using a text-dependent speaker verification (TD-SV) model, a first portion of the audio data that characterizes the predetermined hotword to generate a text-dependent evaluation vector representing voice characteristics of the utterance of the hotword and generating one or more text-dependent confidence scores. Each text-dependent confidence score indicates a likelihood that the text-dependent evaluation vector matches a respective one of one or more text-dependent reference vectors, and each text-dependent reference vector is associated with a respective one of one or more different enrolled users of the user device. The operations further include determining whether any of the one or more text-dependent confidence scores satisfy a confidence threshold. When one of the text-dependent confidence scores satisfy the confidence threshold, the operations include identifying a speaker of the utterance as the respective enrolled user that is associated with the text-dependent reference vector corresponding to the text-dependent confidence score that satisfies the confidence threshold, and initiating performance of the action specified by the query without performing speaker verification on a second portion of the audio data that characterizes the query following the hotword. When none of the one or more text-dependent confidence scores satisfy the confidence threshold, the operations include providing an instruction to a text-independent speaker verifier. The instruction, when received by the text-independent speaker verifier, causes the text-independent speaker verifier to process, using a text-independent speaker verification (TI-SV) model, the second portion of the audio data that characterizes the query to generate a text-independent evaluation vector. The operations further include generating one or more text-independent confidence scores each indicating a likelihood that the text-independent evaluation vector matches a respective one of one or more text-independent reference vectors. Each text-independent reference vector is associated with a respective one of the one or more different enrolled users of the user device. The operations also include determining, based on the one or more text-dependent confidence scores and the one or more text-independent confidence scores, whether the identity of the speaker that spoke the utterance includes any of the one or more different enrolled users of the user device.

This aspect may include one or more of the following optional features. In some implementations each of the one or more different enrolled users of the user device has permissions for accessing a different respective set of personal resources, and performance of the action specified by the query requires access to the respective set of personal resources associated with the respective enrolled user identified as the speaker of the utterance. In some examples the data processing hardware executes the TD-SV model and resides on the user device, and the text-independent speaker verifier executes the TI-SI model and resides on a distributed computing system in communication with the user device via a network. In these examples, when none of the one or more text-dependent confidence scores satisfy the confidence threshold, providing the instruction to the text-independent speaker verifier includes transmitting the instruction and the one or more text-dependent confidence scores from the user device to the distributed computing system.

In some implementations, the data processing hardware resides on one of the user device or a distributed computing system in communication with the user device via a network. Here, the data processing hardware executes both the TD-SV model and the TI-SV model. In some examples, the TI-SV model is more computationally intensive than the TD-SV model. In some implementations, the operations further include detecting, using a hotword detection model, the predetermined hotword in the audio data that precedes the query, where the first portion of the audio data that characterizes the predetermined hotword is extracted by the hotword detection model.

In some examples, the TD-SV model and the TI-SV model are trained on a plurality of training data sets. Each training data set is associated with a different respective language or dialect and includes corresponding training utterances spoken in the respective language or dialect by different speakers. Each corresponding training utterance includes a text-dependent portion characterizing the predetermined hotword and a text-independent portion characterizing a query statement that follows the predetermined hotword. Here, the TD-SV model is trained on the text-dependent portion of each corresponding training utterance in each training data set of the plurality of training data sets, and the TI-SV model is trained on the text-independent portion of each corresponding training utterance in each training data set of the plurality of training data sets. In these examples, the corresponding training utterances spoken in the respective language or dialect associated with at least one of the training data sets may pronounce the predetermined hotword differently than the corresponding training utterances of the other training data sets. In some additional examples, the TI-SV model is trained on the text-dependent portion of at least one corresponding training utterance in one or more of the plurality of training data sets. Additionally, or alternatively, the query statements characterized by the text-independent portions of the training utterances include variable linguistic content.

In some implementations, when generating the text-independent evaluation vector, the text-independent speaker verifier uses the TI-SV model to process both the first portion of the audio data that characterizes the predetermined hotword and the second portion of the audio data that characterizes the query. Additionally or alternatively, each of the one or more text-dependent reference vectors is generated by the TD-SV model in response to receiving one or more previous utterances of the predetermined hotword spoken by the respective one of the one or more different enrolled users of the user device. Each of the one or more text-independent reference vectors may be generated by the TI-SV model in response to receiving one or more previous utterances spoken by the respective one of the one or more different enrolled users of the user device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
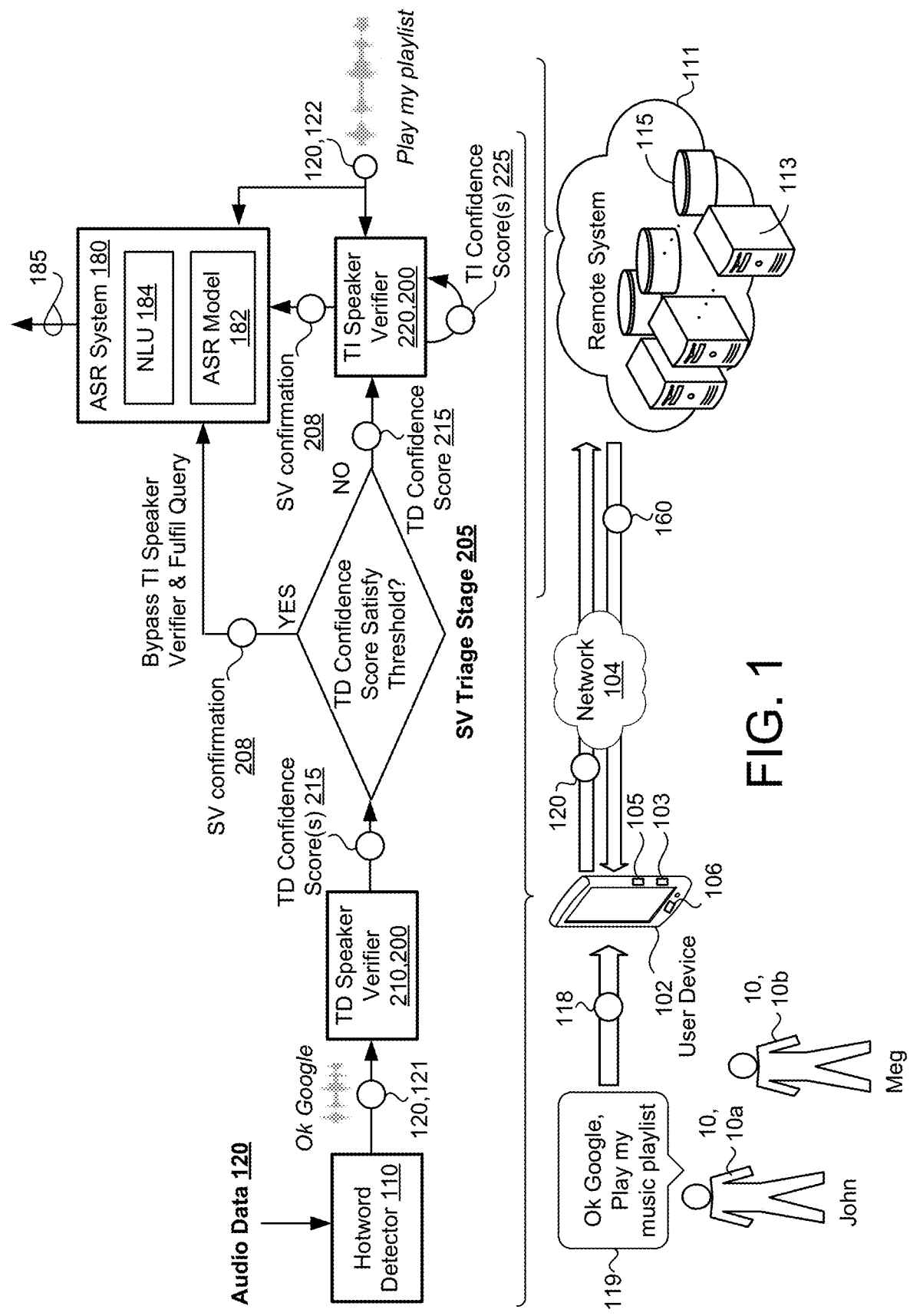
FIG. 1 is a schematic view of an example speech environment having a multilingual speaker verification system.

In a speech-enabled environment, such as a home, automobile, workplace, or school, a user may speak a query or command and a digital assistant may answer the query and/or cause the command to be performed. Such a speech-enabled environment may be implemented using a network of connected microphone devices distributed through various rooms or areas of the environment. Through the network of microphones, a user can query the digital assistant through a spoken utterance without having to have a computer or other interface in front of them. In some instances, the speech-enabled environment is associated with multiple enrolled users, e.g., people who live in a household. These instances may apply when a single device is shared by multiple users such as a smart phone, smart speaker, smart display, tablet device, smart television, smart appliance, vehicle infotainment system, etc. Here, the speech-enabled environment may have a limited number of users, e.g., between two and six people in a speech-enabled home, office, or automobile. As such, it is desirable to determine an identity of a particular user that is speaking the query. The process of determining the identities of particular speakers/users may be referred to as speaker verification, speaker recognition, speaker identification, or voice recognition.

Speaker verification may allow a user to issue queries that act on behalf of the particular user and/or trigger personalized responses in multi-user environments. Speaker verification (e.g., voice authentication) provides an easy way for a user of a user device to gain access to the user device. Speaker verification allows the user to unlock, and access, the user's device by speaking an utterance without requiring the user manually enter (e.g., via typing) a passcode to gain access to the user device. However, the existence of multiple different languages, dialects, accents, and the like, presents certain challenges for speaker verification.

In some scenarios, a user queries the digital assistant that relates to personal information of the user and/or requires access to a resource from a set of personal resources associated with the user. For instance, a particular user (e.g., one who is enrolled with the digital assistant) might ask the digital assistant "when is my meeting with Matt" or query the digital assistant "play my music playlist". Here, the user may be one of one or more multiple enrolled users who each have permission to access their own respective set of personal resources (e.g., calendar, music player, email, messaging, contact list, etc.) and are restricted from accessing the personal resources of the other enrolled users. For instance, if John and Meg are both enrolled users of the digital assistant, the digital assistant would need to discern whether John or Meg spoke the utterance "when is my meeting with Matt" in order to access the appropriate enrolled user's calendar to determine when a meeting is scheduled with Matt and respond with meeting details for the scheduled meeting with Matt. Similarly, the digital assistant would need to discern which one of John or Meg spoke the utterance "play my music playlist" in order to access a music player and ultimately audibly output tracks from the appropriate music playlist since John and Meg have unique music playlists.

To determine which user is speaking in a multiuser, speech-enabled environment, speech-enabled systems may include speaker verification systems (e.g., speaker identification systems or voice authentication systems). Speaker verification systems may use two types of models to verify the speaker. For a hotword (e.g., keyword, wake word, trigger phrase) portion of an utterance, the system may use one or more text-dependent models, and for the remainder of the utterance that typically characterizes a query, the system may use one or more text-independent models. Combining these two types of models may provide enhanced accuracy for verifying the speaker, and in particular, during the initial uses of the speaker verification system.

By speaking a particular hotword (e.g., "Hey Google" or "Ok Google") of one or more terms in an utterance, a digital assistant executing on a user device may be triggered/invoked to process (e.g., through automated speech recognition (ASR)) and fulfill a query spoken in the utterance that follows the particular hotword. A hotword detector executing on the user device may detect the presence of the particular hotword in streaming audio captured by the user device and trigger the user device to wake-up from a sleep state and initiate processing (e.g., ASR) on subsequent audio data characterizing the query portion of the utterance. The hotword detector may extract a first portion of the audio data that characterizes the hotword, which may be used as a basis to perform text-dependent speaker verification. The first portion of the audio data may include a fixed-length audio segment of about 500 milliseconds (ms) of audio data.

Generally, a text-dependent model for verifying an identity of the speaker from the first portion of the audio data that characterizes the hotword of the utterance executes on a speech-enabled device, while a text-independent model for identifying the speaker from a second portion of the audio data that characterizes a query following the hotword executes on a remote server in communication with the speech-enabled device. The text-dependent model may output a respective text-dependent speaker vector that may be compared with one or more reference vectors each associated with one or more different enrolled users of the user device to determine a first confidence score corresponding to a first likelihood that the speaker that spoke the utterance corresponds to a particular enrolled user. The text-independent model may also output a respective text-independent speaker vector that may be compared with one or more reference vectors each associated with the one or more different enrolled users to determine a second confidence score corresponding a second likelihood that the speaker that spoke the utterance corresponds to the particular enrolled user. The first and second confidence scores may be combined to ultimately determine whether or not the speaker that spoke the utterance corresponds to the particular enrolled user.

Notably, there are challenges with training these text-independent and text-dependent models in speaker verification systems at scale to a broad base of users across multiple different languages and dialects. Specifically, it is difficult and time consuming to obtain training samples of speech data for training the models for each language and dialect individually. Low resource languages present difficult challenges since sufficient training samples of speech data in these languages is scarce. Moreover, using separate text-independent and text-dependent models for each language requires significant human and computational effort to maintain and update while in productions, and requires the training of new models for new languages that were previously unsupported. For instance, to train new text-dependent and text-independent models for a new language to be added, training samples of speech data with speaker labels must be available for the language of interest.

To alleviate the challenges with building and supporting multiple speaker verification systems across multiple different languages, implementations herein are directed toward a multilingual speaker verification system having hybrid multilingual text-dependent and text-independent speaker verification models trained on different languages and dialects. By training each of the text-dependent and text-independent speaker verification models on multiple languages and dialects, the multilingual speaker verification system is able to generalize to unseen languages not used in training and maintain speaker verification performance on both high- and low-resource languages used in training. As used herein, the multilingual text-dependent and text-independent speaker verification models each refer to a single respective model that can be used to accurately verify the identifies of speakers that speak different languages or dialects. That is, neither of the text-dependent nor the text-independent speaker verification models are dependent on or limited to speech being in a specific single language or dialect. As a result, rather than using different models for different languages, dialects, and/or accents, a respective single model can be trained for each of the text-dependent and text-independent speaker verification models.

While utilizing the combination of text-dependent and text-independent speaker verification models optimizes speaker verification performance/accuracy of the speaker verification system, employing the text-independent speaker verification model incurs increased computational costs. That is, text-dependent speaker verification models are generally lightweight models that run on a user device, while text-independent speaker verification models are more computationally intensive and require a larger memory footprint than text-dependent speaker verification models rendering text-independent speaker verification models more suitable for execution on a remote server. In addition to the increased computational costs incurred by running the text-independent speaker verification model, latency for fulfilling the query also increases proportionally to the duration of time needed to perform the computations by both of the text-dependent and text-independent speaker verification models. To reduce the overall computational burden and still maintain optimal speaker verification performance/accuracy of the speaker verification system, implementations herein are further directed toward a speaker verification triage stage that only causes the text-independent speaker verification model to perform text-independent speaker verification when text-dependent confidence scores associated with the text-dependent speaker verification fail to satisfy a confidence threshold. Otherwise, when a text-dependent confidence score indicating a likelihood that a text-dependent evaluation vector generated by the TD-SV model matches a respective text-dependent reference vector satisfies the confidence threshold, the triage system may permit the speaker verification system to bypass the need for the text-independent speaker verification model to perform text-independent speaker verification.

Referring to FIG. 1, in some implementations, an example speech-enabled environment includes a user device 102 associated with one or more users 10 and in communication with a remote system 111 via a network 104. The user device 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 107. The user device 102 includes or is in communication with one or more microphones 106 for capturing utterances from the respective user 10. The remote system 111 may be a single computer, multiple computers, or a distributed system (e.g., a cloud environment) having scalable/elastic computing resources 113 (e.g., data processing hardware) and/or storage resources 115 (e.g., memory hardware).

The user device 102 includes a hotword detector 110 (also referred to as a hotword detection model) configured to detect the presence of a hotword in streaming audio 118 without performing semantic analysis or speech recognition processing on the streaming audio 118. The user device 102 may include an acoustic feature extractor (not shown) which may be implemented as part of the hotword detector 110 or as a separate component for extracting audio data 120 from utterances 119. For instance, the acoustic feature extractor may receive streaming audio 118 captured by the one or more microphones 106 of the user device 102 that corresponds to an utterance 119 spoken by the user 10 and extract the audio data 120. The audio data 120 may include acoustic features such as Mel-frequency cepstrum coefficients (MFCCs) or filter bank energies computed over windows of an audio signal. In the example shown, the utterance 119 spoken by the user 10 includes "Ok Google, Play my music playlist"

The hotword detector 110 may receive the audio data 120 to determine whether the utterance 119 includes a particular hotword (e.g., Ok Google) spoken by the user 10. That is, the hotword detector 110 may be trained to detect the presence of the hotword (e.g., Ok Google) or one or more variants of the hotword (e.g., Hey Google) in the audio data 120 to cause the user device 102 to wake-up from a sleep state or hibernation state and trigger an automated speech recognition (ASR) system 180 to perform speech recognition on the hotword and/or one or more other terms that follow the hotword, e.g., a voice query that follows the hotword and specified an action to perform. In the example shown, the query following the hotword in utterance 119 captured in the streaming audio includes "Play my music playlist" that specifies an action for the digital assistant to access a music playlist associated with the particular user (e.g., John) 10 and provide a response 160 including an audio track from John's music playlist for the user device 10 (and/or one or more designated audio output devices) to playback for audible output from a speaker. Hotwords may be useful for "always on" systems that may potentially pick up sounds that are not directed toward the speech-enabled user device 102. For example, the use of hotwords may help the device 102 discern when a given utterance 119 is directed at the device 102, as opposed to an utterance that is directed to another individual present in the environment or a background utterance. In doing so, the device 102 may avoid triggering computationally expensive processing, e.g., speech recognition and semantic interpretation, on sounds or utterances that do not include a hotword In some examples, the hotword detector 110 is a multilingual hotword detector 110 trained on multiple different languages or dialects.

The speech-enabled environment 100 includes a multilingual speaker verification system 200 that is configured to determine an identity of the user 10 that is speaking the utterance 119 by processing the audio data 120. The multilingual speaker verification system 200 may determine whether identified user 10 is an authorized user such that the query is only fulfilled (e.g., the action specified by the query is performed) if the user is identified as an authorized user. Advantageously, the multilingual speaker verification system 200 allows the user to unlock and access the user's device 102 by speaking the utterance without requiring the user to manually enter (e.g., via typing) or speak a passcode or provide some other means of verification (e.g., answer a challenge question, provide biometric verification data, etc.) to gain access to the user device 102.

In some examples, the speech-enabled environment 100 includes a multi-user, speech-enabled environment in which multiple different users 10, 10a-n (FIG. 2) are each enrolled with the user device 102 and have permission to access a respective set of personal resources (e.g., calendar, music player, email, messaging, contact list, etc.) associated with that user. Enrolled users 10 are restricted from accessing personal resources from the respective sets of personal resources associated with the other enrolled users. Each enrolled user 10 may have a respective user profile that links to the respective set of personal resources associated with that user, as well as other pertinent information (e.g., user-specified preference settings) associated with that user 10. Accordingly, the multilingual speaker verification system 200 may be used to determine which user is speaking the utterance 119 in the multiuser, speech-enabled environment 100. For instance, in the example shown, John and Meg may both be enrolled users 10 of the user device 102 (or digital assistant interface running on the user device), and the digital assistant needs to discern whether John or Meg spoke the utterance 119 "Ok Google, Play my music playlist" in order to access a music player and ultimately audibly output tracks from the appropriate music playlist since Meg and John may each have unique music playlists. Here, the multilingual speaker verification system 200 processes one or more portions 121, 122 of the audio data 120 corresponding to the utterance 119 to identify that John was the speaker of the utterance 119.

With continued reference to FIG. 1, after the hotword detector 110 detects the presence of the hotword (e.g., Ok Google) in the audio data 120, a text-dependent (TD) verifier 210 of the multilingual speaker verification system 200 receives a first portion 121 of the audio data 120 that characterizes the hotword detected by the hotword detector 110. The hotword detector 110 may extract, from the audio data 120, an audio segment corresponding to the first portion 121 of the audio data 120. In some examples, the first portion 121 of the audio data 120 includes a fixed-length audio segment of a duration sufficient to contain audio features of the spoken hotword or other terms/phrases the hotword detector is trained to detect and the TD verifier 210 is trained to perform speaker verification on. The TD verifier 210 is configured to process, using a text-dependent speaker verification (TD-SV) model 212 (FIG. 2), the first portion 121 of the audio data 120 and output one or more TD confidence scores 215 each indicating a likelihood that the hotword characterized by the first portion 121 of the audio data 120 was spoken by a respective one of one or more different enrolled users 10 of the user device 102. Notably, the predetermined hotword when spoken in utterances serves two purposes: determine whether the user 10 is invoking the user device 102 to process a subsequent voice query; and determine the identity of the user 10 that spoke the utterance. The TD verifier 210 is configured to execute on the user device 102. Moreover, and as discussed in greater detail below, the TD-SV model 212 includes a lightweight model suitable for storage and execution on user devices.

To increase speaker verification accuracy, the multilingual speaker verification system 200 may also employ a text-independent (TI) verifier 220 to verify the identity of the user 10 that spoke the utterance 119. The TI verifier 220 may be configured to process, using a text-independent speaker verification (TI-SV) model 222 (FIG. 2), a second portion 122 of the audio data 120 that characterizes the query following the hotword and output one or more TI confidence scores 225 each indicating a likelihood that the query characterized by the second portion 122 of the audio data 120 was spoken by a respective one of the one or more different enrolled users 10 of the user device 102. In the example shown, the query characterized by the second portion 122 of the audio data 120 includes "Play my music playlist". In some examples, the TI-SV model 222 additionally processes the first portion 121 of the audio data 120 such that the one or more TI confidence scores 225 are based on both the first and second portions 121, 122 of the audio data 120. In some implementations, the TI verifier 220 receives the one or more TD confidence scores 215 output from the TD verifier 210 and determines, based on the one or more TD confidence scores 215 and the one or more TI confidence scores 225, whether the identity of the speaker that spoke the utterance 119 includes any of the one or more different enrolled users 10 of the user device 102. For instance, the TI verifier 220 may identify the speaker of the utterance 119 as the enrolled user 10a John.

The TI verifier 220 is more computationally intensive than the TD verifier 210, and therefore, the TI verifier 220 is more computationally expensive to run than the TD verifier 210. Moreover, the TI verifier 220 requires a much larger memory footprint than the TD verifier 210. As such, the TI verifier 220 is more suitable for executing on the remote system 111. However, the TI verifier 220 may execute on the user device 102 in other implementations.

While combining the TD and TI verifiers 210, 220 provides enhanced accuracy for verifying/identifying a speaker, there are trade-offs due to increased computational costs incurred by performing speaker verification at the TI verifier 220. In addition to the increased computational costs incurred by running the TI verifier 220, latency for fulfilling the query also increases proportionally to the duration of time needed to perform the additional computations by the TI verifier 220 on longer durations of the audio data 120. To reduce the overall computational burden and decrease latency, yet not sacrifice speaker verification performance/accuracy of the multilingual speaker verification system 200, the multilingual speaker verification system 200 includes an intermediary speaker verification triage stage 205 that permits the multilingual speaker verification system 200 to only invoke the TI verifier 220 when none of the one or more TD confidence scores 215 output from the TD verifier 210 satisfy a confidence threshold. That is, in scenarios when the SV triage stage 205 determines that a TD confidence score 215 output from the TD verifier 210 satisfies the confidence threshold (YES), the multilingual speaker verification system 200 may bypass speaker verification at the TI verifier 220 and provide a SV confirmation 208 to the ASR system 180 that identifies the speaker of the utterance 119 as the respective enrolled user 10 associated with the TD confidence score 215 for the spoken hotword that satisfied the confidence threshold. The SV confirmation 208, when received by the ASR system 180, may instruct the ASR system 180 to initiate performance of the action specified by the query without requiring the TI verifier 220 to perform speaker verification on the second portion 122 of the audio data 120 that characterizes the query following the hotword. In the example shown, the ASR system 180 includes an ASR model 182 configured to perform speech recognition on the second portion 122 of the audio data 120 (and optionally the first portion 121 of the audio data 120 in addition to the second portion 122) that characterizes the query.

The ASR system 180 also includes a natural language understanding (NLU) module 184 configured to perform query interpretation on the speech recognition result output by the ASR model 182. Generally, the NLU module 184 may perform semantic analysis on the speech recognition result to identify the action to perform that is specified by the query. In the example shown, the NLU module 184 may determine that performance of the action specified by the query "Play my music playlist", requires access to a respective set of personal resources associated with a respective enrolled user 10 of the user device 102. Thus, the NLU module 184 determines that the action specified by the query is missing a necessary parameter, i.e., the identity of the user, needed to perform the action. Accordingly, the NLU module 184 uses the SV confirmation 208 identifying a particular enrolled user (e.g., John) 10a as the speaker of the utterance 119, and therefore initiates fulfillment of the query by providing an output instruction 185 to perform the action specified by the query. In the example shown, the output instruction 185 may instruct a music streaming service to stream a music track from the enrolled user John's music playlist. The digital assistant interface may provide the response 160 to the query that includes the music track for audible output from the user device 102 and/or one or more other devices in communication with the user device 102.

Notably, since the TD confidence score 215 satisfied the confidence threshold, the NLU module 184 was able to expedite fulfillment of the query since NLU module 184 could rely on the identity of the enrolled user determined by the TD verifier 210 without having to wait for the TI verifier 220 to perform additional computations to identify the enrolled user.

In scenarios when the SV triage stage 205 determines that none of the one or more TD confidence scores 215 output from the TD verifier 210 satisfy the confidence threshold, the SV triage stage 205 may pass the one or more TD confidence scores 215 to the TI verifier 220 and instruct the TI verifier 220 to perform speaker verification on at least the second portion 122 of the audio data 120 that characterizes the query following the hotword in the utterance 119. The TI verifier 220 may perform the speaker verification by processing the second portion 122 of the audio data 120 to generate the one or more TI confidence scores 225 each indicating the likelihood that the query was spoken by the respective one of the one or more different enrolled users 10 of the user device 102. In some implementations, the TI verifier 220 combines the generated pair of TD and TI confidence scores 215, 225 associated with each respective enrolled user 10 to determine a combined confidence score indicating whether the identity of the speaker that spoke the utterance includes the respective enrolled user 10. For example, if there are four enrolled users 10a-d of the user device, the TI verifier 220 would combine four separate pairings of generated TD and TI scores 215, 225 to generate four combined confidence scores each indicating a likelihood that the utterance 119 was spoken the respective one of the four different enrolled users 10 of the user device. The enrolled user associated with the highest combined confidence score may be identified as the speaker of the utterance 119.

In some examples, the TI verifier 220 combines the TD and TI confidence scores 215, 225 by averaging the TD and TI scores 215, 225. In some examples, the TI verifier 220 computes a weighted average of the confidence scores 215, 225 to obtain the combined confidence score. For instance, the TD confidence score 215 may be weighted more heavily than the TI confidence score 225. In one example, the TD confidence score 215 is multiplied by a weight of 0.75 while the TI confidence score 215 is multiplied by a weight of 0.25. In other examples, the TI confidence score 225 is weighted more heavily than the TD confidence score 215. In some implementations, the weighting applied to the TD and TI confidence scores 215, 225 is dynamic such that the applied weights may vary over time. That is, the TD confidence score 215 may initially be weighted more heavily than the TI confidence score 215 as a reflection of possible higher accuracy associated with the TD verifier 210 compared to the TI verifier 220. But over time, the TI verifier 220 may be updated based on subsequent utterances of users, and eventually become more accurate than the TD verifier 210 for performing speaker verification. As a result, the TI confidence scores 225 output by the TI verifier 220 may eventually be weighted more heavily than the TD confidence scores 215 output by the TD verifier 210.

Figure 2:
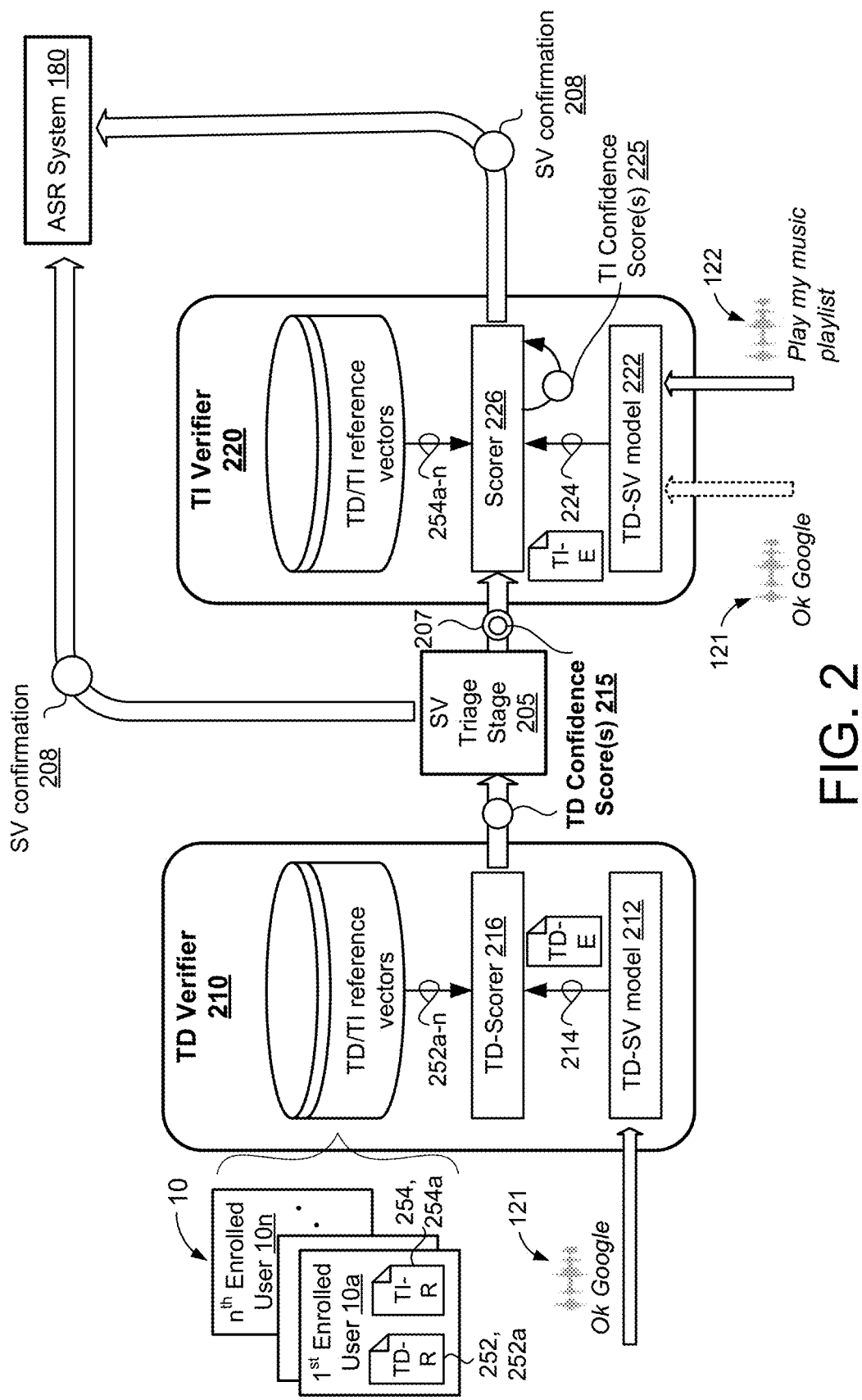
FIG. 2 is a schematic view of the multilingual speaker verification system of FIG. 1.

FIG. 2 provides a schematic view of the multilingual speaker verification system 200 of FIG. 1. The multilingual speaker verification system 200 includes the TD verifier 210 having the multilingual TD-SV model 212, and the TI verifier 220 having the multilingual TI-SV model 222. In some implementations, each enrolled user 10 of the user device 102 has permissions for accessing a different respective set of personal resources, where performance of a query characterized by the second portion 122 of the audio data 120 requires access to the respective set of personal resources associated with the enrolled user 10 identified as the speaker of the utterance 119. Here, each enrolled user 10 of the user device 102 may undertake a voice enrollment process to obtain respective enrolled user reference vectors 252, 254 from audio samples of multiple enrollment phrases spoken by the enrolled user 10. For example, multilingual TD-SV model 212 may generate one or more text-dependent (TD) reference vectors 252 from a predetermined term (e.g., hotword) in enrollment phrases spoken by each enrolled user 10 that may be combined, e.g., averaged or otherwise accumulated, to form the respective TD reference vector 252. Additionally, the multilingual TI-SV model 222 may generate one or more text-independent (TI) reference vectors 254 from the audio samples of enrollment phrases spoken by each enrolled user that may be combined, e.g., averaged or otherwise accumulated, to form the respective TI reference vectors 254.

One or more of the enrolled users 10 may use the user device 102 to conduct the voice enrollment process, where the microphone 106 captures the audio samples of these users speaking the enrollment utterances and the multilingual TD-SV model 212 and multilingual TI-SV model 222 generates the respective TD reference vectors 252 and TI reference vectors 254 therefrom. Additionally, one or more of the enrolled users 10 may enroll with the user device 102 by providing authorization and authentication credentials to an existing user account with the user device 102. Here, the existing user account may store a TD reference vector 252 and a TI reference vector 254 obtained from a previous voice enrollment process conducted by a respective user with another device also linked to the user account.

In some examples, the TD reference vector 252 for an enrolled user 10 is extracted from one or more audio samples of the respective enrolled user 10 speaking a predetermined term such as the hotword (e.g., "Ok Google") used for invoking the user device to wake up from a sleep state. In some implementations, the TD reference vector 252 is generated by the multilingual TD-SV model 212 in response to receiving one or more previous utterances of the predetermined hotword spoken by the respective enrolled user 10 of the user device 102. For instance, audio data characterizing a predetermined hotword detected by a hotword detector with high confidence and also resulting in a TD evaluation vector 214 associated with a high confidence score of matching a TD reference vector 252 stored for a particular enrolled user, may be used to refine/update/re-train the TD-SV model 212. Additionally, the TI reference vector 254 for an enrolled user 10 may be obtained from one or more audio samples of the respective enrolled user 10 speaking phrases with different terms/words and of different lengths. For instance, the TI reference vector 254 may be obtained over time from audio samples obtained from speech interactions the user 10 has with the user device 102 or other devices linked to the same account. In other words, the TI reference vector 254 may be generated by the multilingual TI-SV model 222 in response to receiving one or more previous utterances spoken by the enrolled user 10 of the user device 102.

In some examples, the multilingual speaker verification system 200 resolves the identity of the user 10 that spoke the utterance 119 using the TD verifier 210. The TD verifier 210 identifies the user 10 that spoke the utterance 119 by first extracting, from the first portion 121 of the audio data 120 that characterizes the predetermined hotword spoken by the user, a text-dependent (TD) evaluation vector 214 representing voice characteristics of the utterance of the hotword. Here, the TD verifier 210 may execute a multilingual TD-SV model 212 configured to receive the first portion 121 of the audio data 120 as input and generate, as output, the TD evaluation vector 214. The multilingual TD-SV model 212 may be a neural network model (e.g., first neural network 330) trained under machine or human supervision to output TD evaluation vector 214.

Once the TD evaluation vector 214 is output from the multilingual TD-SV model 212, the TD verifier 210 determines whether the TD evaluation vector 214 matches any of the TD reference vectors 252 stored on the user device 102 (e.g., in the memory hardware 107) for enrolled users 10, 10a-n of the user device 102. As described above, the multilingual TD-SV model 212 may generate the TD reference vectors 252 for the enrolled users 10 during a voice enrollment process. Each TD reference vector 252 may be used as a reference vector corresponding to a voiceprint or unique identifier representing characteristics of the voice of the respective enrolled user 10 speaking the predetermined hotword.

In some implementations, the TD verifier 210 uses a text-dependent (TD) scorer 216 that compares the TD evaluation vector 214 to the respective TD reference vector 252 associated with each enrolled user 10a-n of the user device 102. Here, the TD scorer 216 may generate a score for each comparison indicating a likelihood that the utterance 119 corresponds to an identity of the respective enrolled user 10. Specifically, the TD scorer 216 generates a text-dependent (TD) confidence score 215 for each enrolled user 10 of the user device 102. In some implementations, the TD scorer 216 computes a respective cosine distance between the TD evaluation vector 214 and each TD reference vector 252 to generate a TD confidence score 215 for each respective enrolled user 10.

When the TD scorer 216 generates the TD confidence scores 215 indicating a likelihood that the utterance 119 corresponds to each of the respective enrolled users 10, the speaker verification (SV) triage stage 205 determines whether any of the TD confidence scores 215 satisfy a confidence threshold. In some implementations, the SV triage stage 205 determines that a TD confidence score 215 satisfies the confidence threshold. In these implementations, the multilingual speaker verification system 200 bypasses speaker verification at the TI verifier 220 and instead provides SV confirmation 208 to the ASR system 108 that identifies the speaker of the utterance 119 as the respective enrolled user 10 associated with the TD confidence score 215 that satisfied the confidence threshold.

Conversely, when the SV triage stage 205 determines that none of the TD confidence scores 215 satisfy the confidence threshold, the SV triage stage 205 provides the TD confidence scores 215 generated by the TD verifier 210 and an instruction 207 to the TI verifier 220. Here, the instruction 207 when received by the TI verifier 220 causes the TI verifier 220 to resolve the identity of the user 10 that spoke the utterance 119. The TI verifier 220 identifies the user 10 that spoke the utterance 119 by first extracting, from the second portion 122 of the audio data 120 that characterizes the query following the predetermined hotword, a text-independent (TI) evaluation vector 224 representing voice characteristics of the utterance 119. To generate the TI evaluation vector 224, the TI verifier 220 may execute a multilingual TI-SV model 222 configured to receive the second portion 122 of the audio data 120 as input and generate, as output, the TI evaluation vector 224. In some implementations, the multilingual TI-SV model 222 receives both the first portion 121 of the audio data 120 and the second portion 122 of the audio data 120 and processes both the first portion 121 and the second portion 122 to generate the TI evaluation vector 224. In some additional implementations, the TI-SV model 222 may process additional audio data that follows the query portion of the utterance 119. For instance, the utterance 119 may include a query to "Send the following message to Mom," and also include additional audio corresponding contents of the message, "I'll be home for dinner". The multilingual TI-SV model 222 may be a neural network model (e.g., second neural network 340) trained under machine or human supervision to output TI evaluation vector 224.

Once the TI evaluation vector 224 is output from the multilingual TI-SV model 222, the TI verifier 220 determines whether the TI evaluation vector 224 matches any of the TI reference vectors 254 stored on the user device 102 (e.g., in the memory hardware 107) for the different enrolled users 10, 10a-n of the user device 102. As described above, the multilingual TI-SV model 222 may generate the TI reference vectors 254 for the enrolled users 10 during a voice enrollment process. Each TI reference vector 254 may be used as a reference vector corresponding to a voiceprint or unique identifier representing characteristics of the voice of the respective enrolled user 10.

In some implementations, the TI verifier 220 uses a scorer 226 that compares the TI evaluation vector 224 to the respective TI reference vector 254 associated with each enrolled user 10a-n of the user device 102. Here, the scorer 226 may generate a score for each comparison indicating a likelihood that the utterance 119 corresponds to an identity of the respective enrolled user 10. Specifically, the scorer 226 generates a text-independent (TI) confidence score 225 for each enrolled user 10 of the user device 102. In some implementations, the scorer 226 computes a respective cosine distance between the TI evaluation vector 224 and each TI reference vector 254 to generate a TI confidence score 225 for each respective enrolled user 10. Additionally, the scorer 226 combines the generated pairs of TD and TI confidence scores 215, 225 for each enrolled user 10 to determine a combined confidence score indicating whether the identity of the speaker that spoke the utterance 119 includes the respective enrolled user 10. As discussed above with respect to FIG. 1, the weights of the TD confidence score 215 and the TI confidence score 225 used to obtain the combined confidence score may differ, and/or dynamically change over time.

The TI verifier 220 may identify the user 10 that spoke the utterance 119 as the respective enrolled user associated with the highest combined confidence score. In these implementations, the TI verifier 220 provides the SV confirmation 208 to the ASR system 108 that identifies the speaker of the utterance 119 as the respective enrolled user 10 associated with the highest combined score. In some examples, the TI verifier 220 determines whether the highest combined confidence score satisfies a threshold and identifies the speaker only when the combined confidence score satisfies the threshold. Otherwise, the TI verifier 220 may instruct the user device to prompt the user to speak an additional verification utterance and/or answer authentication questions.

Figure 3:
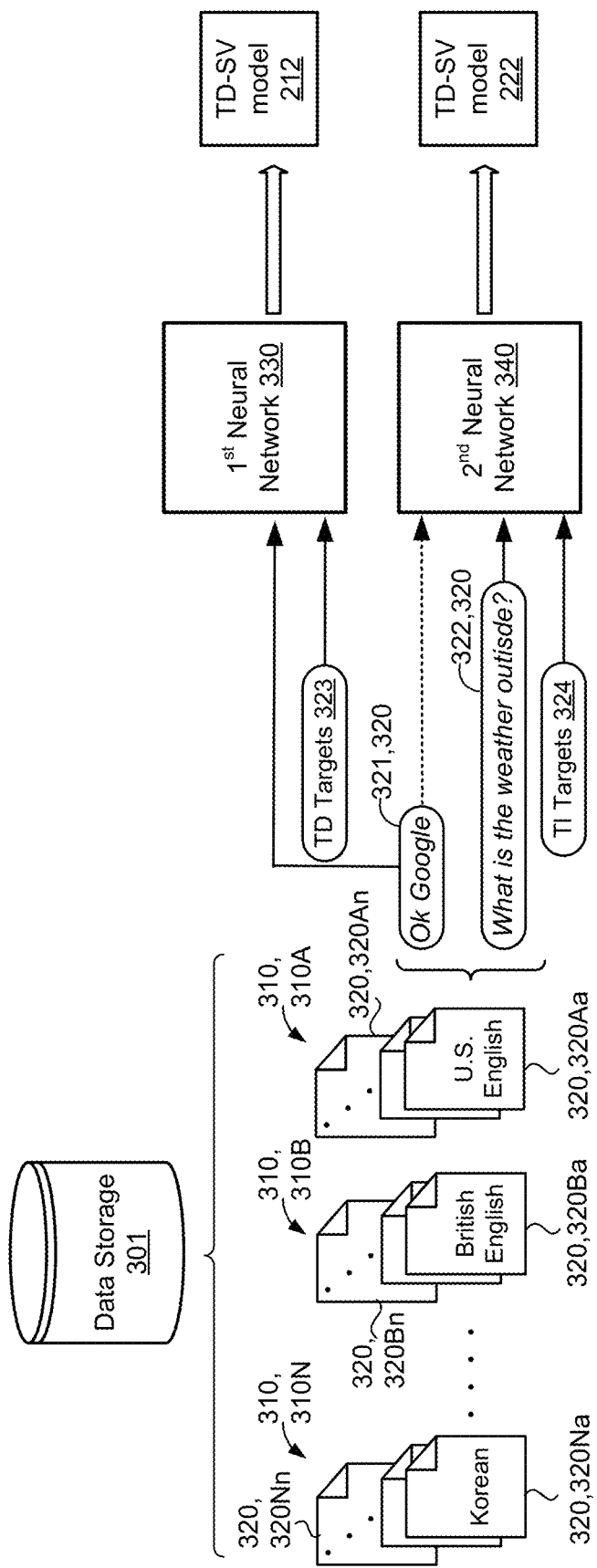
FIG. 3 is a schematic view of an example training process for training the multilingual speaker verification system of FIG. 1.

FIG. 3 shows an example multilingual speaker verification training process 300 for training the multilingual speaker verification system 200. The training process 300 may execute on the remote system 111 of FIG. 1. The training process 300 obtains a plurality of training data sets 310, 310A-N stored in data storage 301 and trains each of the TD-SV model 212 and the TI-SV model 222 on the training data sets 310. The data storage 301 may reside on the memory hardware 113 of the remote system 111. Each training data set 310 is associated with a different respective language or dialect and includes corresponding training utterances 320, 320Aa-Nn spoken in the respective language or dialect by different speakers. For instance, a first training data set 310A may be associated with American English and include corresponding training utterances 320Aa-An spoken in English by speakers from the United States of America. That is, the training utterances 320Aa-An in the first training data set 310A are all spoken in English with an American accent. On the other hand, a second training data set 310B associated with British English includes corresponding training utterances 320Ba-Bn also spoken in English but by speakers from Great Britain. Accordingly, the training utterances 320Ba-Bn in the second raining data set 310B are spoken in English with a British accent, and are therefore associated with a different dialect (i.e., British Accent) than the training utterances 320Aa-An associated with the American accent dialect. Notably, an English speaker with a British accent may pronounce some words differently than another English speaker with an American accent. FIG. 3 also shows another training data set 310N associated with Korean that includes corresponding training utterances 320Na-Nn spoken by Korean speakers.

In some implementations, the training process 300 trains the multilingual speaker verification system 200 on at least twelve (12) training data sets each associated with a different respective language. In additional implementations, the training process 300 trains the multilingual speaker verification system 200 on training utterances 320 covering forty-six (46) different languages and sixty-three (63) dialects.

Each corresponding training utterance 320 includes a text-dependent portion 321 and a text-independent portion 322. The text-dependent portion 321 includes an audio segment characterizing a predetermined hotword (e.g., "Hey Google") or a variant of the predetermined hotword (e.g., "Ok Google") spoken in the training utterance 320. The audio segment associated with the text-dependent portion 321 may include a fixed-length audio segment (e.g., 1,175 milliseconds of audio) represented by a sequence of fixed-length frames containing audio features (e.g., 40-dimensional log Mel filter bank energies features or mel-frequency cepstral coefficients). Here, the predetermined hotword and variant thereof may each be detectable by the hotword detector 110 when spoken in streaming audio 118 to trigger a user device to wake-up and initiate speech recognition on one or more terms following the predetermined hotword or variant thereof. In some examples, the fixed-length audio segment associated with the text-dependent portion 321 of the corresponding training utterance 320 that characterizes the predetermined hotword (or variant thereof) is extracted by the hotword detector 110.

The same predetermined hotword may be used across multiple different languages, however, due to different linguistic characteristics such as accents across languages and dialects, the pronunciation of the same predetermined hotword or variant thereof varies across the languages and dialects. Notably, the hotword detector 110 deployed in some geographic regions may be trained to detect a different predetermined hotword in streaming audio, and therefore, the text-dependent portion 321 of the corresponding training utterances 320 spoken in the languages or dialects associated with these geographic areas may instead characterize the different predetermined hotword. As will become apparent, the trained multilingual TD-SV model 212 is able to distinguish speakers of different languages or dialects based on the predetermined hotword, variations of the predetermined hotword, or based on different hotwords unique to specific languages or geographical regions. In additional implementations, the text-dependent portion 321 in some training utterances 320 includes audio segments characterizing other terms/phrases in addition to or in lieu of the predetermined hotword or variant of the predetermined hotword, such as custom hotwords or commonly used voice commands (e.g., play, pause, volume up/down, call, message, navigate/directions to, etc.).

The text-independent portion 322 in each training utterance 320 includes an audio segment that characterizes a query statement spoken in the training utterance 320 following the predetermined hotword characterized by the text-dependent portion 321. For instance, the corresponding training utterance 320 may include "Ok Google, What is the weather outside?" whereby the text-dependent portion 321 characterizes the hotword "Ok Google" and the text-independent portion 322 characterizes the query statement "What is the weather outside". While the text-dependent portion 321 in each training utterance 320 is phonetically constrained by the same predetermined hotword or variation thereof, the lexicon of the query statement characterized by each text-independent portion 322 is not constrained such that the duration and phonemes associated with each query statement is variable. Notably, the language of the spoken query statement characterized by the text-dependent portion 321 includes the respective language associated with the training data set 310. For instance, the query statement "What is the weather outside" spoken in English translates to "Cual es el clima afuera" when spoken in Spanish. In some examples, the audio segment characterizing the query statement of each training utterance 320 includes a variable duration ranging from 0.24 seconds to 1.60 seconds.

With continued reference to FIG. 3, the training process 300 trains a first neural network 330 on the text-dependent portions 321 of the training utterances 320, 320Aa-Nn spoken in the respective language or dialect associated with each training data set 310, 310A-N. During training, additional information about the text-dependent portions 321 may be provided as input to the first neural network 330. For instance, text-dependent (TD) targets 323, such as TD target vectors, corresponding to ground-truth output labels for training the TD-SV model 212 to learn how to predict may be provided as input to the first neural network 330 during training with the TD portions 321. Thus, one or more utterances of the predetermined hotword from each particular speaker may be paired with a particular TD target vector 323.

The first neural network 330 may include a deep neural network formed from multiple long short-term memory (LSTM) layers with a projection layer after each LSTM layer. In some examples, the first neural network uses 128 memory cells and the projection size is equal to 64. The multilingual TD-SV model 212 includes a trained version of the first neural network 330. The TD evaluation and reference vectors 214, 252 generated by the TD-SV model 212 may include d-vectors with an embedding size equal to the projection size of the last projection layer. The training process may use generalized end-to-end contrast loss for training the first neural network 330.

After training, the first neural network 330 generates the multilingual TD-SV model 212. The trained multilingual TD-SV model 212 may be pushed to a plurality of user devices 102 distributed across multiple geographical regions and associated with users that speak different languages, dialects or both. The user devices 102 may store and execute the multilingual TD-SV model 212 to perform text-dependent speaker verification on audio segments characterizing the predetermined hotword detected by a hotword detector 110 in streaming audio 118. As described earlier, even when the same hotword is spoken in different languages or locations, users having different languages, dialects, accents, or locations may pronounce the hotword differently. These variations in pronunciation of prior speaker verification models trained on only one language, and often improperly attributed this pronunciation variability resulting from language or accent as a speaker-distinctive characteristic. For instance, the rate of false positives in verification increased when these prior models interpret general features of regional accent to be the main distinctive elements of a particular speaker's voice, when in fact the features are actually common to all users who speak with the same or similar accent. The trained multilingual TD-SV model 212 of the present disclosure is able to distinguish one user from other users having the same language, dialect, accent, or location.

The training process 300 also trains a second neural network 340 on the text-independent (TI) portions 322 of the training utterances 320, 320Aa-Nn spoken in the respective language or dialect associated with each training data set 310, 310A-N. Here, for the training utterance 320Aa, the training process 300 trains the second neural network on the TI portion 322 characterizing the query statement "what is the whether outside" spoken in American English. Optionally, the training process may also train the second neural network 340 on the TD portion 321 of at least one corresponding training utterance 320 in one or more of the training data sets 310 in addition to the TI portion 322 of the corresponding training utterance 320. For instance, using the training utterance 320Aa above, the training process 300 may train the second neural network 340 on the entire utterance "Ok Google, what is the weather outside?" During training, additional information about the TI portions 322 may be provided as input to the second neural network 340. For instance, TI targets 324, such as TI target vectors, corresponding to ground-truth output labels for training the TI-SV model 222 to learn how to predict may be provided as input to the second neural network 340 during training with the TI portions 322. Thus, one or more utterances of query statements from each particular speaker may be paired with a particular TI target vector 324.

The second neural network 340 may include a deep neural network formed from multiple LSTM layers with a projection layer after each LSTM layer. In some examples, the second neural network uses 384 memory cells and the projection size is equal to 128. The multilingual TI-SV model 222 includes a trained version of the second neural network 340. The TI evaluation and reference vectors 224, 254 generated by the TI-SV model 222 may include d-vectors with an embedding size equal to the projection size of the last projection layer. The training process 300 may use generalized end-to-end contrast loss for training the first neural network 330. In some examples, the trained multilingual TD-SV model 212 is associated with a small memory footprint (e.g., 235 k parameters) suitable for running on user devices 102, while the trained multilingual TI-SV model 222 is more computationally intensive and has a much larger capacity (e.g., 1.3 million parameters) suitable for running on the remote system.

Figure 4:
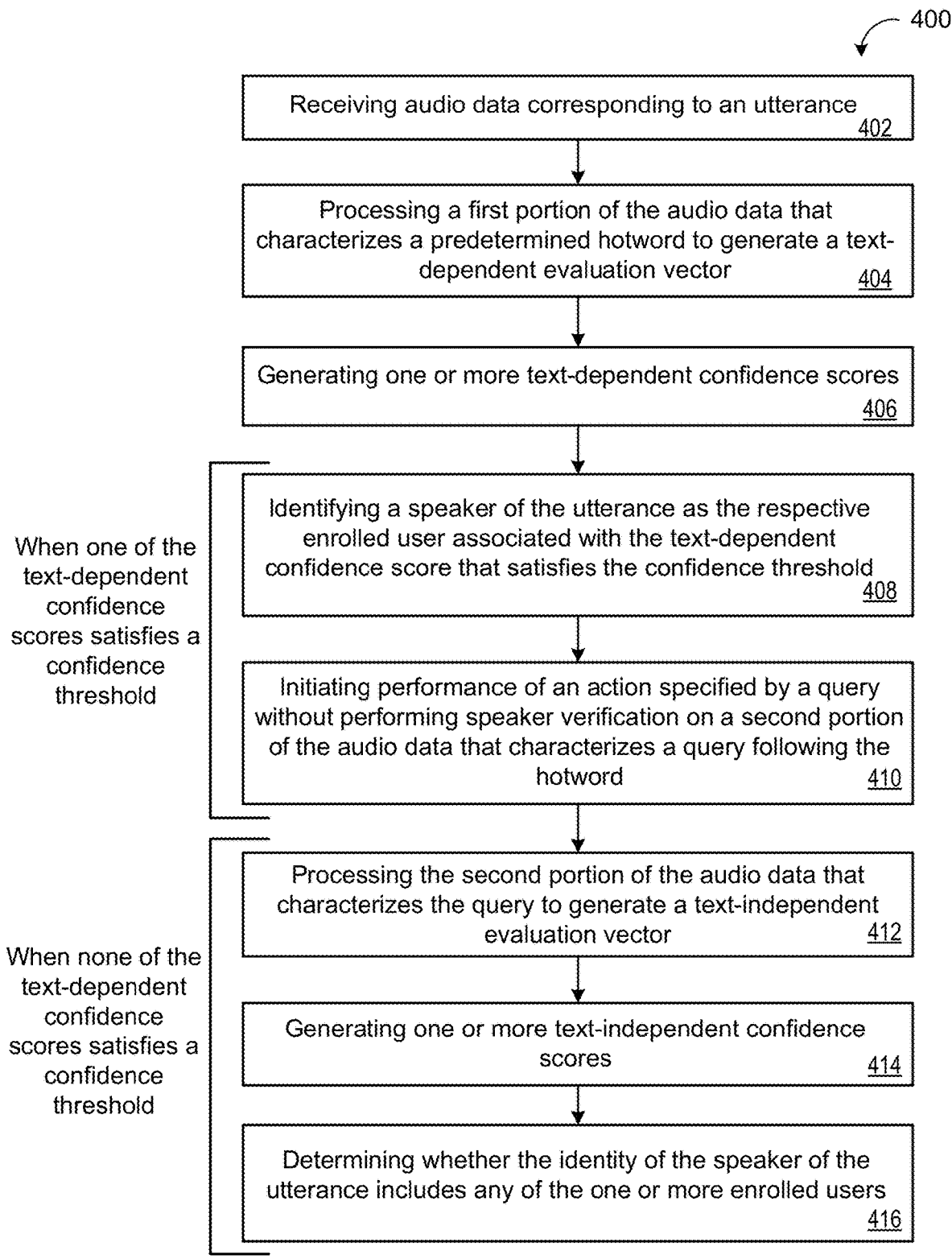
FIG. 4 is a flowchart of an example arrangement of operations for a method of verifying an identify of a speaker using speaker verification system.

FIG. 4 includes a flowchart of an example arrangement of operations for a method 400 of hybrid multilingual text-dependent and text-independent speaker verification. At operation 402, the method 400 includes receiving audio data 120 corresponding to an utterance 119 captured by a user device 102, the utterance 119 includes a predetermined hotword followed by a query specifying an action to perform. The method 400 at operation 404 further includes processing, using a text-dependent speaker verification (TD-SV) model 212, a first portion 121 of the audio data 120 that characterizes the predetermined hotword to generate a text-dependent (TD) evaluation vector 214 representing voice characteristics of the utterance 119 of the hotword.

At operation 406, the method 400 includes generating one or more text-dependent (TD) confidence scores 215 each indicating a likelihood that the TD evaluation vector 214 matches a respective one of one or more text-dependent (TD) reference vectors 252. Each TD reference vector 252 is associated with a respective one of one or more different enrolled users 10 of the user device 102. The method 400 further includes, at operation 406, determining whether any of the one or more TD confidence scores 215 satisfies a confidence threshold.

When one of the TD confidence scores 215 satisfies the confidence threshold, the method 400 includes, at operation 408, identifying a speaker of the utterance 119 as the respective enrolled user 10 that is associated with the TD reference vector 252 corresponding to the TD confidence score 215 that satisfies the confidence threshold. The method 400 also includes, at operation 410, initiating performance of an action specified by the query without performing speaker verification on a second portion 122 of the audio data 120 that characterizes the query following the hotword. When none of the one or more TD confidence scores 215 satisfy the confidence threshold, the method 400 includes, at operation 412, providing an instruction to a text-independent speaker verifier 220 to process, using a text-independent speaker verification (TI-SV) model 222, the second portion 122 of the audio data 120 that characterizes the query to generate a text-independent (TI) evaluation vector 224. At operation 414, the method 400 also includes generating one or more text-independent (TI) confidence scores 225 each indicating a likelihood that the TI evaluation vector 224 matches a respective one of one or more text-independent (TI) reference vectors 254. Each TI reference vector 254 is associated with a respective one of the one or more different enrolled users 10 of the user device 102. At operation 416, the method 400 further includes determining, based on the one or more TD confidence scores 215 and the one or more TI confidence scores 225, whether the identity of the speaker that spoke the utterance 119 includes any of the one or more different enrolled users 10 of the user device 102.

Figure 5:
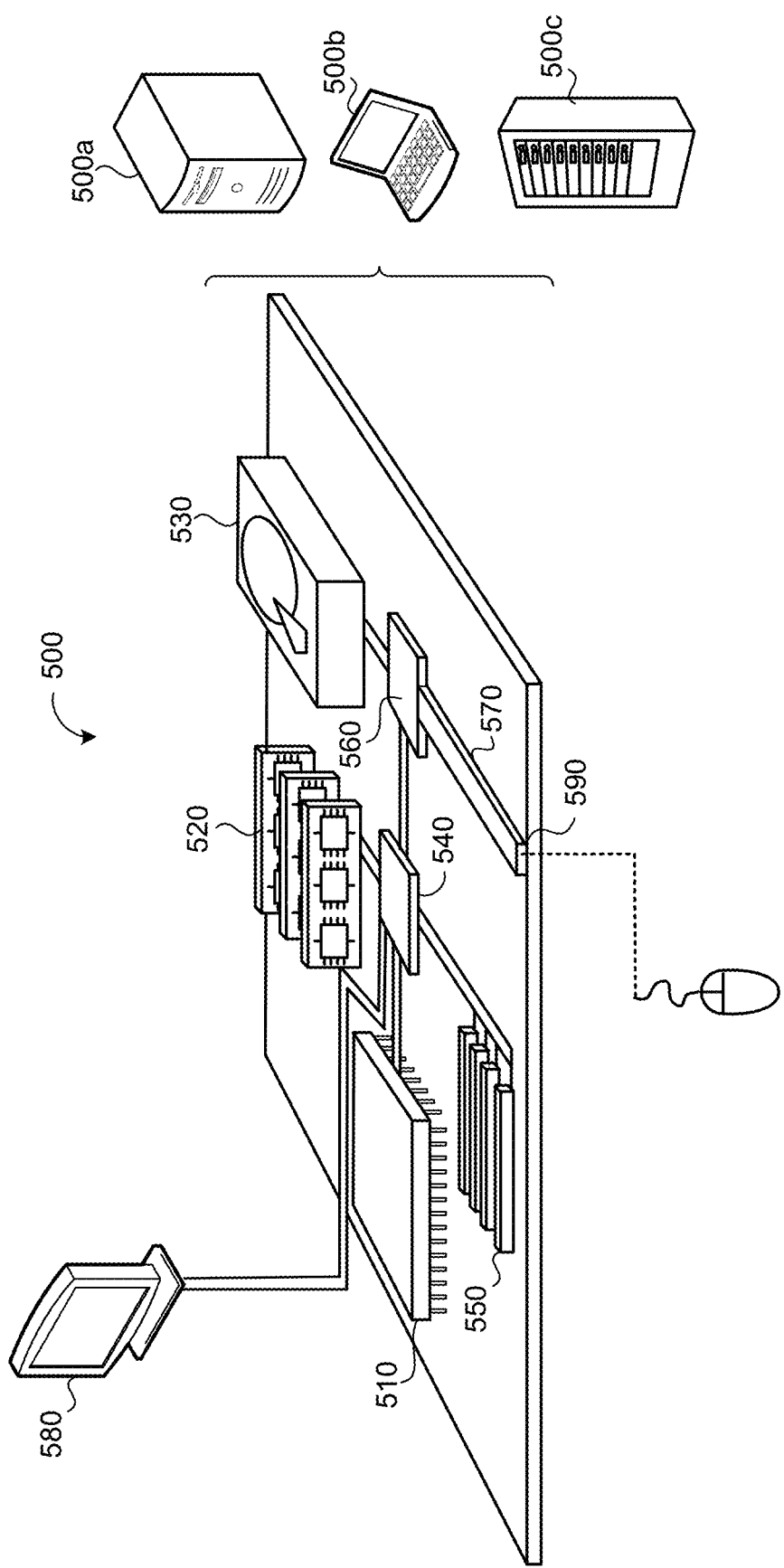
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for speaker verification when executed on data processing hardware causes the data processing hardware to perform operations comprising:
   receiving audio data corresponding to an utterance captured by a user device, the utterance comprising a predetermined hotword followed by a query specifying an action to perform;
   processing, using a text-dependent speaker verification (TD-SV) model, a first portion of the audio data that characterizes the predetermined hotword to generate a text-dependent evaluation vector representing voice characteristics of the utterance of the hotword;
   generating one or more text-dependent confidence scores each indicating a likelihood that the text-dependent evaluation vector matches a respective one of one or more text-dependent reference vectors, each text-dependent reference vector associated with a respective one of one or more different enrolled users of the user device;
   determining whether any of the one or more text-dependent confidence scores satisfy a confidence threshold; and one of:
   when one of the text-dependent confidence scores satisfy the confidence threshold:
      identifying a speaker of the utterance as the respective enrolled user that is associated with the text-dependent reference vector corresponding to the text-dependent confidence score that satisfies the confidence threshold; and
      initiating performance of the action specified by the query without performing speaker verification on a second portion of the audio data that characterizes the query following the predetermined hotword; or when none of the one or more text-dependent confidence scores satisfy the confidence threshold, providing an instruction to a text-independent speaker verifier, the instruction when received by the text-independent speaker verifier, causing the text-independent speaker verifier to:
  process, using a text-independent speaker verification (TI-SV) model, the second portion of the audio data that characterizes the query to generate a text-independent evaluation vector, wherein the TI-SV model is more computationally intensive than the TD-SV model;
  generate one or more text-independent confidence scores each indicating a likelihood that the text-independent evaluation vector matches a respective one of one or more text-independent reference vectors, each text-independent reference vector associated with a respective one of the one or more different enrolled users of the user device; and
  determine, based on the one or more text-dependent confidence scores and the one or more text-independent confidence scores, whether the identity of the speaker that spoke the utterance includes any of the one or more different enrolled users of the user device,
wherein the data processing hardware resides on one of the user device or a distributed computing system in communication with the user device via a network, the data processing hardware executing both the TD-SV model and the TI-SV model.

2. The computer-implemented method of claim 1, wherein:
  each of the one or more different enrolled users of the user device has permissions for accessing a different respective set of personal resources; and
  performance of the action specified by the query requires access to the respective set of personal resources associated with the respective enrolled user identified as the speaker of the utterance.

3. The computer-implemented method of claim 1, wherein:
  the data processing hardware executes the TD-SV model and resides on the user device; and
  the text-independent speaker verifier executes the TI-SI model and resides on a distributed computing system in communication with the user device via a network.

4. The computer-implemented method of claim 3, wherein, when none of the one or more text-dependent confidence scores satisfy the confidence threshold, providing the instruction to the text-independent speaker verifier comprises transmitting the instruction and the one or more text-dependent confidence scores from the user device to the distributed computing system.

5. The computer-implemented method of claim 1, wherein the operations further comprise:
  detecting, using a hotword detection model, the predetermined hotword in the audio data that precedes the query,
  wherein the first portion of the audio data that characterizes the predetermined hotword is extracted by the hotword detection model.

6. The computer-implemented method of claim 1, wherein:
  the TD-SV model and the TI-SV model are trained on a plurality of training data sets, each training data set associated with a different respective language or dialect and comprising corresponding training utterances spoken in the respective language or dialect by different speakers, each corresponding training utterance comprising a text-dependent portion characterizing the predetermined hotword and a text-independent portion characterizing a query statement that follows the predetermined hotword;
  the TD-SV model is trained on the text-dependent portion of each corresponding training utterance in each training data set of the plurality of training data sets; and
  the TI-SV model is trained on the text-independent portion of each corresponding training utterance in each training data set of the plurality of training data sets.

7. The computer-implemented method of claim 6, wherein the corresponding training utterances spoken in the respective language or dialect associated with at least one of the training data sets pronounce the predetermined hotword differently than the corresponding training utterances of the other training data sets.

8. The computer-implemented method of claim 6, wherein the TI-SV model is trained on the text-dependent portion of at least one corresponding training utterance in one or more of the plurality of training data sets.

9. The computer-implemented method of claim 6, wherein the query statements characterized by the text-independent portions of the training utterances comprise variable linguistic content.

10. The computer-implemented method of claim 1, wherein, when generating the text-independent evaluation vector, the text-independent speaker verifier uses the TI-SV model to process both the first portion of the audio data that characterizes the predetermined hotword and the second portion of the audio data that characterizes the query.

11. The computer-implemented method of claim 1, wherein each of the one or more text-dependent reference vectors is generated by the TD-SV model in response to receiving one or more previous utterances of the predetermined hotword spoken by the respective one of the one or more different enrolled users of the user device.

12. The computer-implemented method of claim 1, wherein each of the one or more text-independent reference vectors is generated by the TI-SV model in response to receiving one or more previous utterances spoken by the respective one of the one or more different enrolled users of the user device.

13. A system comprising:
  data processing hardware; and
  memory hardware in communication with the data processing hardware, the memory hardware storing instructions that when executed on the data processing hardware cause the data processing hardware to perform operations comprising:
    receiving audio data corresponding to an utterance captured by a user device, the utterance comprising a predetermined hotword followed by a query specifying an action to perform;
    processing, using a text-dependent speaker verification (TD-SV) model, a first portion of the audio data that characterizes the predetermined hotword to generate a text-dependent evaluation vector representing voice characteristics of the utterance of the hotword;
    generating one or more text-dependent confidence scores each indicating a likelihood that the text-dependent evaluation vector matches a respective one of one or more text-dependent reference vectors, each text-dependent reference vector associated with a respective one of one or more different enrolled users of the user device;

determining whether any of the one or more text-dependent confidence scores satisfy a confidence threshold; and one of:
  when one of the text-dependent confidence scores satisfy the confidence threshold:
    identifying a speaker of the utterance as the respective enrolled user that is associated with the text-dependent reference vector corresponding to the text-dependent confidence score that satisfies the confidence threshold; and
    initiating performance of the action specified by the query without performing speaker verification on a second portion of the audio data that characterizes the query following the predetermined hotword; or
  when none of the one or more text-dependent confidence scores satisfy the confidence threshold, providing an instruction to a text-independent speaker verifier, the instruction when received by the text-independent speaker verifier, causing the text-independent speaker verifier to:
    process, using a text-independent speaker verification (TI-SV) model, the second portion of the audio data that characterizes the query to generate a text-independent evaluation vector;
    generate one or more text-independent confidence scores each indicating a likelihood that the text-independent evaluation vector matches a respective one of one or more text-independent reference vectors, each text-independent reference vector associated with a respective one of the one or more different enrolled users of the user device; and
    determine, based on the one or more text-dependent confidence scores and the one or more text-independent confidence scores, whether the identity of the speaker that spoke the utterance includes any of the one or more different enrolled users of the user device.

14. The system of claim 13, wherein:
  each of the one or more different enrolled users of the user device has permissions for accessing a different respective set of personal resources; and
  performance of the action specified by the query requires access to the respective set of personal resources associated with the respective enrolled user identified as the speaker of the utterance.

15. The system of claim 13, wherein:
  the data processing hardware executes the TD-SV model and resides on the user device; and
  the text-independent speaker verifier executes the TI-SI model and resides on a distributed computing system in communication with the user device via a network.

16. The system of claim 15, wherein, when none of the one or more text-dependent confidence scores satisfy the confidence threshold, providing the instruction to the text-independent speaker verifier comprises transmitting the instruction and the one or more text-dependent confidence scores from the user device to the distributed computing system.

17. The system of claim 13, wherein the data processing hardware resides on one of the user device or a distributed computing system in communication with the user device via a network, the data processing hardware executing both the TD-SV model and the TI-SV model.

18. The system of claim 13, wherein the TI-SV model is more computationally intensive than the TD-SV model.

19. The system of claim 13, wherein the operations further comprise:
  detecting, using a hotword detection model, the predetermined hotword in the audio data that precedes the query,
  wherein the first portion of the audio data that characterizes the predetermined hotword is extracted by the hotword detection model.

20. The system of claim 13, wherein:
  the TD-SV model and the TI-SV model are trained on a plurality of training data sets, each training data set associated with a different respective language or dialect and comprising corresponding training utterances spoken in the respective language or dialect by different speakers, each corresponding training utterance comprising a text-dependent portion characterizing the predetermined hotword and a text-independent portion characterizing a query statement that follows the predetermined hotword;
  the TD-SV model is trained on the text-dependent portion of each corresponding training utterance in each training data set of the plurality of training data sets; and
  the TI-SV model is trained on the text-independent portion of each corresponding training utterance in each training data set of the plurality of training data sets.

21. The system of claim 20, wherein the corresponding training utterances spoken in the respective language or dialect associated with at least one of the training data sets pronounce the predetermined hotword differently than the corresponding training utterances of the other training data sets.

22. The system of claim 20, wherein the TI-SV model is trained on the text-dependent portion of at least one corresponding training utterance in one or more of the plurality of training data sets.

23. The system of claim 20, wherein the query statements characterized by the text-independent portions of the training utterances comprise variable linguistic content.

24. The system of claim 13, wherein, when generating the text-independent evaluation vector, the text-independent speaker verifier uses the TI-SV model to process both the first portion of the audio data that characterizes the predetermined hotword and the second portion of the audio data that characterizes the query.

25. The system of claim 13, wherein each of the one or more text-dependent reference vectors is generated by the TD-SV model in response to receiving one or more previous utterances of the predetermined hotword spoken by the respective one of the one or more different enrolled users of the user device.

26. The system of claim 13, wherein each of the one or more text-independent reference vectors is generated by the TI-SV model in response to receiving one or more previous utterances spoken by the respective one of the one or more different enrolled users of the user device.

* * * * *